Nov. 25, 1952        K. H. LOW        2,619,362

CUSHION DEVICE

Filed June 23, 1950

INVENTOR.
Kenneth H. Low
BY
Alex E. MacRae
Attorney.

Patented Nov. 25, 1952

2,619,362

UNITED STATES PATENT OFFICE 2,619,362

CUSHION DEVICE

Kenneth H. Low, Ottawa, Ontario, Canada

Application June 23, 1950, Serial No. 169,875

3 Claims. (Cl. 280—150)

This invention relates to a cushioning device for the protection of children when riding in motor cars and the like.

There is a well-recognized need for some means to prevent small children, when riding in motor cars, from becoming injured as a result of being thrown about by sudden stopping, starting, turning or other movements of the car. Restraining means, such as special seats, harness and the like have been provided for small children, but heretofore there appears to have been provided no satisfactory means for protecting older children who desire to stand while riding in a motor car. One area in which children most frequently stand is to the right of the driver directly behind the glove compartment portion of the instrument panel, and many children have been injured as a result of violent contact with this portion of the panel.

An object of this invention is to provide cushioning means adapted to be readily attached to various types of glove compartments of motor cars and arranged to safeguard children from hurt or injury by being thrown towards the instrument panel of a motor car. Another object is to provide means associated with such cushioning means to restrain the movement of a child when riding in a motor car while at the same time permitting standing and limited upright movement of the child.

The invention will be described with reference to the accompanying drawing, in which—

Figure 1:
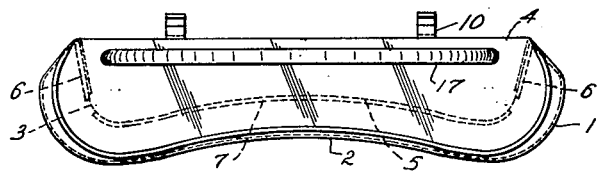
Figure 2:
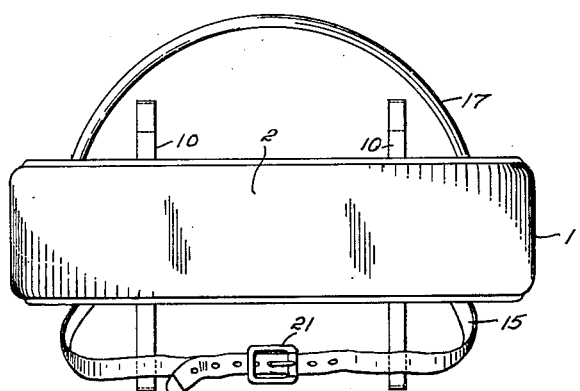
Figure 3:
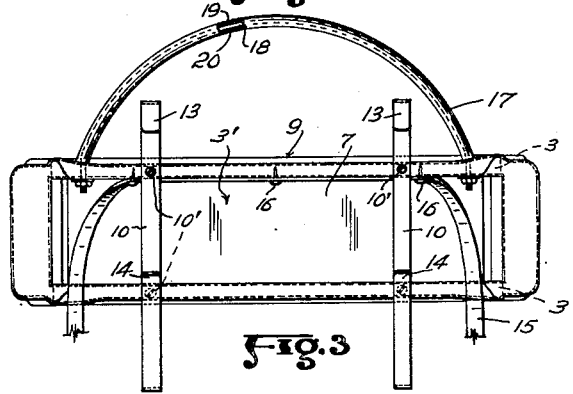
Figure 4:
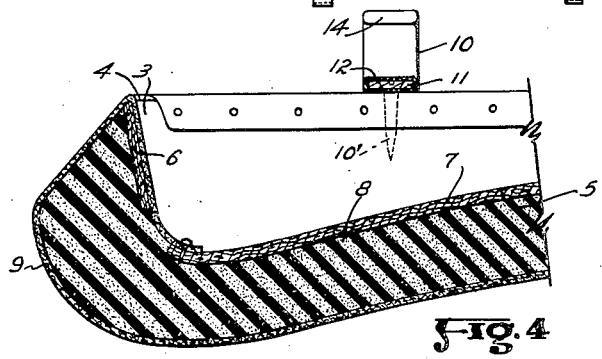

Figure 1 is a plan view of the cushioning means in accordance with the invention, Figure 2 is a front elevation, Figure 3 is a rear elevation, and Figure 4 is a partial sectional plan view.

In the drawing, 1 is an elongated substantially rectangular cushion having a front or forward face 2, which is preferably of slightly concave configuration, as shown. The cushion is mounted on a frame 3' which may comprise a pair of upper and lower rigid members 3, of wood, plastic, or other suitable material, having flat rear edges 4 and forward edges 5 shaped to provide a curved or concave depression between the ends thereof. The ends of the members 3 are rigidly connected together by transverse members 6. Mounted on the forward edges 5 is a strip 7 of plywood or any other suitable rigid material, such strip extending from end to end of the edges 5 and conforming to the concave contour thereof.

The cushion comprises a pad 8 of sponge rubber or other suitable resilient material and completely overlies the frame strip 7 and the ends of members 3 and cross members 6, as shown. It will be apparent that the concave forward face 2 of the cushion results from the contour of the frame as described. The exposed surfaces of the cushion and frame are covered by fabric, leather or other suitable covering material 9, which is tacked to the frame, as shown, and retains the pad 8 in position on the frame.

Mounted on the rear flat edges 4 of the frame, as by screws 10', are a pair of attachment strips 10 extending transversely of the cushion and projecting above and below the same. The strips 10 are preferably formed of readily bendable metal 11 which may be covered with leather 12 or the like. The end portions of each strip are adapted to be inturned or doubled back, as indicated at 13 and 14, for bending around the door of a glove compartment or the like and consequent attachment thereto.

Preferably, the device includes a belt or strap 15, which may be secured as by tacks 16 to the rear portion of the frame 3' and which has its free ends provided with an attaching buckle 21.

The device may also be provided with a hand rail 17, which may comprise a curved metal or like rod 18 extending upwardly from the device and having its ends anchored in the upper frame member 3. The rod is preferably covered with rubber or like resilient material 19 and an outer leather or fabric covering 20.

In use, the device is readily clamped to the door of a glove compartment or the like by bending the end portions 13 and 14 around the upper and lower edges of such door, which may then be opened and closed in the usual manner. The cushion provides an effective guard against injury should a child be thrown forwardly in the adjacent area of the car interior. The concave shape of the cushion surface is curved to receive the child's body. The strap 15 may be fastened around the child's body to restrain movement of the child and thus maintain the child in a safe position at all times. The driver is therefore relieved from concern as to the child's safety and danger of distraction from proper driving is substantially eliminated.

While the dimensions of the device may vary considerably, it is desirable that the cushion be at least a foot long in order to provide adequate protection. A cushion having an overall length of 14½ inches and an overall width of 3¼ inches has been found to be satisfactory.

What is claimed is:

1. A cushioning device for the protection of children comprising a rigid frame having an elongated concave forward face and a flat rearward face, a resilient pad fixed to and overlying said forward face and projecting forwardly and laterally beyond the frame for free engagement by the upright body of a child, a covering secured to the frame and extending over said pad, a pair of strips secured to said rearward face and extending transversely thereof, each said strip having end portions projecting respectively above and below said cushion, said end portions being of readily bendable metallic formation for attachment of the device to a support, a child retaining belt secured to the frame, and a hand rail mounted on the frame and extending upwardly therefrom, said rail having a resilient covering thereon.

2. A cushioning device for the protection of children comprising an elongated rigid frame, a cushion fixed to one side of the frame and projecting forwardly and laterally beyond the frame for free engagement by the upright body of a child, and a pair of inherently rigid strips rigidly secured to the other side of said frame and extending transversely thereof, each said strip having end portions projecting respectively above and below the cushion, said end portions being of readily bendable metal for convenient manual attachment of the device to and detachment from a support.

3. A cushioning device for the protection of children comprising a rigid frame having an elongated concave forward face and a flat rearward face, a cushion fixed to said forward face and projecting forwardly and laterally beyond the frame for free engagement by the upright body of a child, a pair of inherently rigid strips rigidly secured to said rearward face and extending transversely thereof, each said strip having end portions projecting respectively above and below the cushion, said end portions being readily bendable for convenient manual attachment of the device to and detachment from a support, and a child retaining belt secured to the frame.

KENNETH H. LOW.

REFERENCES CITED

The following references are of record in the file of this patent:

UNITED STATES PATENTS

| Number | Name | Date |
|---|---|---|
| 296,975 | Lampton | Apr. 15, 1884 |
| 1,387,049 | Gunderson | Aug. 9, 1921 |
| 2,070,760 | Straith | Feb. 16, 1937 |
| 2,288,692 | Fearson | July 7, 1942 |
| 2,322,755 | Voorhies | June 29, 1943 |
| 2,337,480 | Logan | Dec. 21, 1943 |
| 2,349,092 | Hammer | May 16, 1944 |
| 2,404,505 | Knecht | July 23, 1946 |
| 2,499,993 | Gregg | Mar. 7, 1950 |

FOREIGN PATENTS

| Number | Country | Date |
|---|---|---|
| 5,566 | Great Britain | of 1901 |